(12) United States Patent
Sunkavalli et al.

(10) Patent No.: US 10,515,460 B2
(45) Date of Patent: Dec. 24, 2019

(54) NEURAL NETWORK-BASED CAMERA CALIBRATION

(71) Applicant: ADOBE INC., San Jose, CA (US)

(72) Inventors: Kalyan K. Sunkavalli, San Jose, CA (US); Yannick Hold-Geoffroy, Quebec (CA); Sunil Hadap, Dublin, CA (US); Matthew David Fisher, Palo Alto, CA (US); Jonathan Eisenmann, San Francisco, CA (US); Emiliano Gambaretto, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 3 days.

(21) Appl. No.: 15/826,331

(22) Filed: Nov. 29, 2017

(65) Prior Publication Data
US 2019/0164312 A1    May 30, 2019

(51) Int. Cl.
*G06T 7/80* (2017.01)
*G06N 3/08* (2006.01)
*G06T 7/00* (2017.01)

(52) U.S. Cl.
CPC .............. *G06T 7/80* (2017.01); *G06N 3/08* (2013.01); *G06T 7/97* (2017.01); *G06T 2207/20081* (2013.01)

(58) Field of Classification Search
CPC ... G06T 7/80; G06T 7/97; G06T 2207/20081; G06N 3/08
See application file for complete search history.

(56) References Cited

U.S. PATENT DOCUMENTS

2017/0357877 A1* 12/2017 Lin .................... G06K 9/00228
2018/0150976 A1*  5/2018 Loy ........................ G06K 9/627
(Continued)

OTHER PUBLICATIONS

Conrady, A. E. (1919). Decentred lens-systems. Monthly notices of the royal astronomical society, 79(5), 384-390.
(Continued)

*Primary Examiner* — Antoinette T Spinks
(74) *Attorney, Agent, or Firm* — Shook, Hardy & Bacon L.L.P.

(57) ABSTRACT

Embodiments of the present invention provide systems, methods, and computer storage media directed to generating training image data for a convolutional neural network, encoding parameters into a convolutional neural network, and employing a convolutional neural network that estimates camera calibration parameters of a camera responsible for capturing a given digital image. A plurality of different digital images can be extracted from a single panoramic image given a range of camera calibration parameters that correspond to a determined range of plausible camera calibration parameters. With each digital image in the plurality of extracted different digital images having a corresponding set of known camera calibration parameters, the digital images can be provided to the convolutional neural network to establish high-confidence correlations between detectable characteristics of a digital image and its corresponding set of camera calibration parameters. Once trained, the convolutional neural network can receive a new digital image, and based on detected image characteristics thereof, estimate a corresponding set of camera calibration parameters with a calculated level of confidence.

20 Claims, 8 Drawing Sheets

(56) References Cited

U.S. PATENT DOCUMENTS

| | | | |
|---|---|---|---|
| 2018/0225550 A1* | 8/2018 | Jacobsen | G06K 9/4619 |
| 2018/0247132 A1* | 8/2018 | Liu | G06K 9/00369 |
| 2018/0260651 A1* | 9/2018 | Wang | G06K 9/3241 |
| 2018/0359416 A1* | 12/2018 | Hold-Geoffroy | G06T 7/00 |
| 2019/0041197 A1* | 2/2019 | Gernoth | G06K 9/00221 |
| 2019/0042833 A1* | 2/2019 | Gernoth | G06K 9/00221 |
| 2019/0132520 A1* | 5/2019 | Gupta | H04N 5/23293 |

OTHER PUBLICATIONS

He, K., Zhang, X., Ren, S., & Sun, J. (2016). Deep residual learning for image recognition. In Proceedings of the IEEE conference on computer vision and pattern recognition (pp. 770-778).

Kendall, A., Grimes, M., & Cipolla, R. (Dec. 2015). Posenet: A convolutional network for real-time 6-dof camera relocalization. In Computer Vision (ICCV), 2015 IEEE International Conference on (pp. 2938-2946). IEEE.

Kingma, D. P., & Ba, J. (2014). Adam: A method for stochastic optimization. arXiv preprint arXiv:1412.6980.

Krizhevsky, A., Sutskever, I., & Hinton, G. E. (2012). Imagenet classification with deep convolutional neural networks. In Advances in neural information processing systems (pp. 1097-1105).

Lee, H., Shechtman, E., Wang, J., & Lee, S. (Jun. 2012). Automatic upright adjustment of photographs. In Computer Vision and Pattern Recognition (CVPR), 2012 IEEE Conference on (pp. 877-884). IEEE.

Russakovsky, O., Deng, J., Su, H., Krause, J., Satheesh, S., Ma, S., . . . & Berg, A. C. (2015). Imagenet large scale visual recognition challenge. International Journal of Computer Vision, 115(3), 211-252.

Workman, S., Greenwell, C., Zhai, M., Baltenberger, R., & Jacobs, N. (Sep. 2015). DEEPFOCAL: a method for direct focal length estimation. In Image Processing (ICIP), 2015 IEEE International Conference on (pp. 1369-1373).

Zhang, Z. (2000). A flexible new technique for camera calibration. IEEE Transactions on pattern analysis and machine intelligence, 22(11), 1330-1334.

\* cited by examiner

NEURAL NETWORK-BASED CAMERA CALIBRATION

BACKGROUND

There are a variety of use cases where one may find utility in being able to determine or estimate parameters of a camera that had previously captured an image. For instance, compositing visual elements or virtual objects into a photograph would require a skillful rendering of a virtual object into a scene with accurate perspective, scale, rotation, and the like, such that the object appears as if it belonged therein. Even the slightest errors in the rendering process can throw off realism of a composition. To render the virtual object with precise detail, one would require an accurate estimation or determination of the camera calibration parameters that were employed when the photograph was taken. While various techniques of camera parameter estimation have been generally known to those skilled in the art, such techniques require tedious and error-prone measurements and calculations.

SUMMARY

Embodiments of the present invention relate to techniques for determining camera calibration parameters of digital assets. More specifically, systems and methods are disclosed relating to a deep learning-approach that employs factually-determinable details of a digital asset to automatically and accurately determine camera calibration parameters thereof, among other things. As conventional techniques are inefficient, inaccurate, limited in application, or rely on determinations prone to human error, disclosed embodiments can optimize overall accuracy and resource consumption by employing a streamlined convolutional neural network that, once trained, can immediately and accurately determine, with a relatively high level of confidence, a particular set of camera calibration parameters associated with a digital asset based on detectable characteristics thereof. Additional systems and methods are further disclosed relating to dataset generation and the utilization thereof, to train a convolutional neural network that facilitates the deep learning-approach described in accordance with various embodiments.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
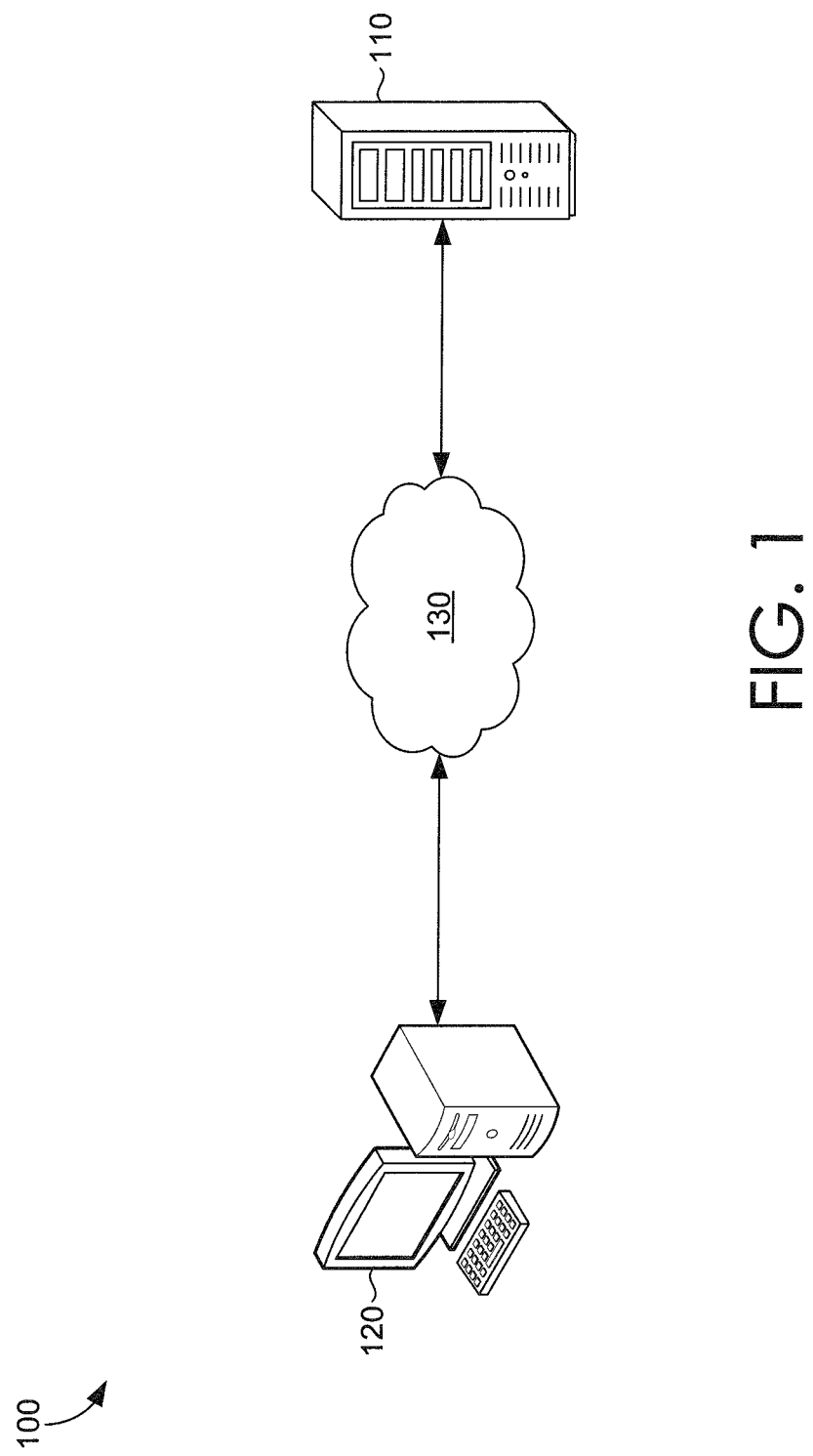
FIG. 1 is an exemplary operating environment of a camera calibration parameter determining system described in accordance with some embodiments of the present invention.

As technology advances, and the demand for more speed and power increases, some tasks continue to rely on human intervention to derive a satisfactory result. For instance, automation has proved a high level of utility in various industries that typically include repetitious tasks with minimal variation, while other industries requiring more complex tasks continue to rely on human intervention that provides real-time guidance to indifferent computers, which can only cover a range of tasks for which they have been programmed to perform. Hence, industries where the workforce must account for task variability and complexity have since remained stagnant with regard to the implementation of computer-facilitated automation.

Recent developments have brought forth working implementations of once-theoretical concepts that have enabled computers to learn and/or advance their own skillsets based on training data, among other things. Whether provided all at once or in real-time, convolutional neural networks can consume training data to establish a foundation of high-confidence correlations from which they can rely on at a later time to make "informed" decisions. In this way, convolution neural networks or "CNNs," now in their infancy, are enabling the automation of more complex tasks, across a broader range of difficulty.

One particular task that has traditionally been "guided" by human intervention is the estimation of camera calibration parameters (e.g., intrinsic, extrinsic) from digital assets, such as electronic images or frames of a digital media, among other things. As the term "digital image" will be referenced herein as an exemplary digital asset, it is not intended to be limiting, and may include any form of electronic or digital media to which the described embodiments can be applied, including digital media, video, animations, illustrations, or one or more frames thereof. Further, as the term "determination" of a camera calibration parameter is utilized herein, the term is not intended to relay the intent of 100% estimation accuracy, but instead a high-confidence estimation of the camera calibration parameter. Lastly, intrinsic camera parameters define internal configurations of a camera, such as camera focal length, camera image sensor format, camera principal point, and camera lens distortion, among other things. Extrinsic camera parameters, on the other hand, define external configurations of the camera with respect to the world, such as location, orientation (e.g., camera pitch, roll, yaw), and the like.

In conventional techniques, the estimation of camera calibration parameters of a scene depicted in a digital image would oftentimes require multiple digital images depicting a scene. That is, multiple depictions or "shots" of the scene, taken from a variety of positions or perspectives, must be analyzed in order to extrapolate camera calibration parameters for a particular digital image. In some other instances, user input in the form of vanishing lines and points must be received in order to extrapolate user-identified characteristics of a depicted scene. Some other conventional techniques even employ automated algorithms to detect these vanishing lines and points. However, such conventional techniques are only successful in detecting these essential characteristics for "box-like" scenes with salient pairs of orthogonal lines, such as a rectangular room or a well-aligned city block, by way of example.

Aside from the benefits of automation, such as long-term time and cost savings, convolutional neural networks provide a wide range of utility across many aspects of technology. For instance, provided that a convolutional neural network is properly trained, its integration into a complex technical workflow can, as noted, eliminate human error. Further, in some implementations, operations which were once central processing unit (CPU)-intensive can now be offloaded to a graphics processing unit (GPU) having a much higher parallelized throughput, freeing up CPU resources for other tasks there were once bogged down by conventional systems. With particular regards to camera calibration parameter determination, not only do the aforementioned features present themselves as clear benefits, but a properly-trained convolutional neural network, in accordance with embodiments described herein, can accurately determine camera calibration parameters in scenes that do not depict the noted essential characteristics (e.g., "box"-like features) that conventional automated techniques rely on to properly perform the same intended task.

Embodiments of the present disclosure are directed to an optimized technique for generating a training dataset to train a convolutional neural network that accurately determines camera calibration parameters, such as extrinsic camera parameters, of a digital image by way of generated confidence levels. Further embodiments are directed to modifying a readily-available convolutional neural network to accurately determine camera calibration parameters of a digital image by way of generated confidence levels, and employing a convolutional neural network in accordance with some of the described embodiments to accurately determine camera calibration parameters of a digital image by way of generated confidence levels.

More specifically, embodiments of the present invention include an optimized technique for generating a training dataset that can be employed to train a convolutional neural network configured to determine, with a high level of confidence, camera calibration parameters of a provided digital image. In more detail, an image dataset generator is described, which can extract or "crop" many different images with a limited field of view from a single panoramic image, such as an image with a larger field of view, to generate a convolutional neural network training dataset. The image with the larger field of view can be any image from which the many different images are extracted, such as a panoramic image, a 360-degree panoramic image, a partial panoramic image, or simply an image having a relatively large field of view in comparison to the many different images extracted therefrom. The image dataset generator can, among other things, generate and/or employ results of a statistical analysis performed on various image datasets, which provides the image dataset generator with a range of plausible camera calibration parameters that can be employed to define guidelines specific to each parameter type (e.g., aspect ratio, focal length, camera pitch, camera roll) when extracting random image samples from the single 360-degree panoramic image. In this way, the extracted samples can provide a fair and plausible representation of images typically taken from a camera. The extracted image samples are each associated (e.g., in metadata or separately referenced) with a corresponding set of the camera parameters (e.g., aspect ratio, focal length, camera pitch, camera roll) that were randomly selected for its extraction from the panoramic image.

In some embodiments, a computing device, such as a convolutional neural network host, can obtain one or more image datasets that are each extracted from a corresponding single panoramic image, with each extracted image in an image dataset having a corresponding set of image parameters. An obtained image dataset can be provided to a convolutional neural network that has, among other things, a plurality of convolutional neural network neurons that are each mapped to one of a plurality of discretized bins that represent a distribution of detected image characteristics across a defined range of values.

As described, this range of values can correspond, at least in part, to a range of plausible camera calibration parameters determined based on a statistical analysis performed on various image datasets. In this way, as a digital image is being analyzed by the convolutional neural network, any detected image characteristic that corresponds to a value within the range of plausible camera parameters can be detected by a corresponding convolutional neural network neuron (e.g., corresponding to the particular value) that generates, as output, a signal and/or a value based on a confidence that the detected image characteristic does, in fact, correspond to the value within the range of plausible camera calibration parameters.

In some other embodiments, a plurality of different digital images can be extracted from a single panoramic image based on a random selection of camera calibration parameters, such as extrinsic camera parameters, that are each limited to a corresponding range that is generally associated with a typical digital image taken with a camera. The plurality of different digital images, among other things, can then be employed to train a convolutional neural network.

In some further embodiments, the convolution neural network can be modified or optimized for the described use case by encoding a parameter scheme that, among other things, can define a process for determining camera calibration parameters, such as extrinsic camera parameters, from a digital image based on detectable characteristics of the digital image. Once the parameter scheme is encoded (e.g., detectable characteristics and corresponding values are mapped to determinable camera calibration parameters), the convolutional neural network can be trained based on the plurality of extracted different digital images and their corresponding randomly-selected camera calibration parameters. As the corresponding camera calibration parameters of each digital image in a training dataset is associated with the digital image, the convolution neural network can employ deep-learning to establish, reinforce, weaken, or otherwise modify a confidence in relationships between detectable characteristics of the digital image and its corresponding camera calibration parameters.

Turning now to FIG. 1, a schematic depiction is provided illustrating an exemplary system 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 in FIG. 1 includes a neural network host 110 (e.g., a server or other computing device). In some instances, the convolutional neural network (CNN) host 110 can be accessed directly or indirectly over a direct connection or an indirect connection, such a network 130 (e.g., a LAN or the Internet). In this non-limiting example, the neural network host 110 can receive and/or send transmissions to and/or from a client device 120 (e.g., a terminal). It is contemplated, however, that any configuration for accessing and/or managing the neural network host 110 can be employed. For instance, the neural network host 110 can be accessed and/or managed directly or indirectly through one or more network connections. Moreover, a database (not shown) or any other memory device or storage component, can also be included in the system 100 to facilitate storage and/or retrieval of data (e.g., image data) by any one of the illustrated components.

The CNN host 110 can include a convolutional neural network that is trained, or can be trained based on a provided training image dataset, to simultaneously determine, among other things, extrinsic camera parameters (e.g., a camera field of view, camera orientation) of a digital image without having any prior knowledge or previous exposure to the digital image. As noted, however, the convolutional neural network of the CNN host 110 must first be appropriately trained with a large training image dataset that also has camera calibration parameters available for each digital image included therein.

Figure 2:
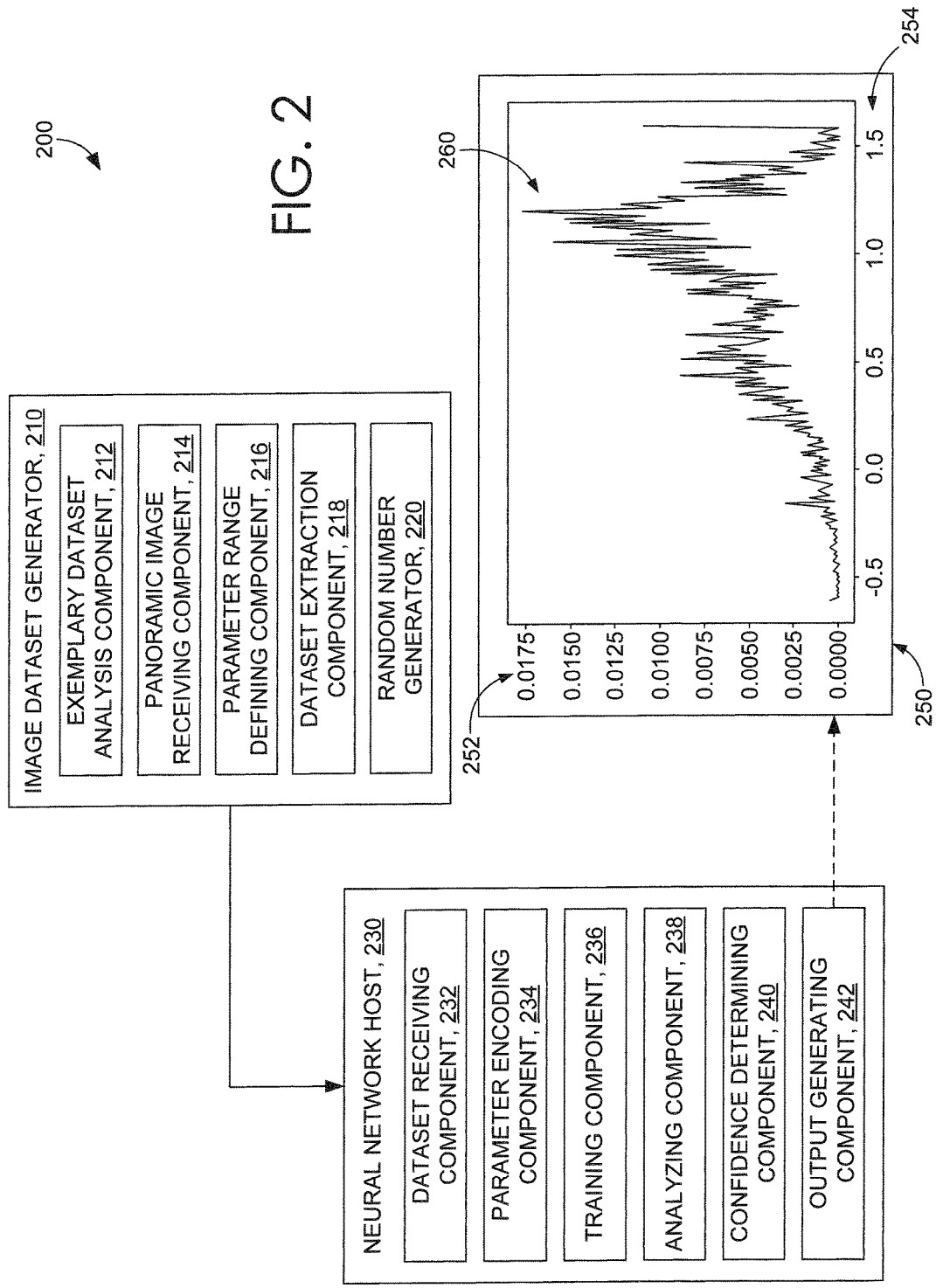
FIG. 2 is a block diagram illustrating an exemplary implementation of an image dataset generator, a neural network host, and an exemplary output from the neural network host in accordance with some embodiments of the present invention.

Referring now to FIG. 2, a block diagram is provided illustrating an exemplary system 200 for training a convolutional neural network that can determine camera calibration parameters corresponding to a camera that captured a digital image, and for implementing or configuring the convolutional neural network to determine the camera calibration parameters of the digital image. Although the described embodiments are included with a focus on extrinsic camera parameters, it is understood that some intrinsic parameters (e.g., focal length) can also be determined in accordance with some embodiments described herein. It is noted that a relationship between intrinsic and extrinsic parameters of a digital image, described in detail herein, is employable to facilitate various embodiments of the present disclosure and, to this end, the system 200 can also be described as one that determines at least some of the intrinsic camera parameters for a camera that captured a digital image.

Depicted in the system 200 is an image dataset generator 210 that can efficiently generate one or more proper training image datasets to train a convolutional neural network, such as one hosted on neural network host 230. As the image dataset generator 210 is merely depicted on a component level, it is contemplated that the image dataset generator 210 can be included in a client device, such as client device 120 of FIG. 1, or can be included as a component of the neural network host 230.

The image dataset generator 210 can include, among other things, an exemplary dataset analysis component 212, a panoramic image receiving component 214, a parameter range defining component 216, a dataset extraction component 218, and a random number generator 220. As each of the described components is depicted as being included in the image dataset generator 210, it is contemplated that any component depicted therein is not limited to the illustrated embodiment, and can be distributed among a plurality of components or computing devices, or in some instances, may be conflated into a single component or module, such as a processor. It is also contemplated that any one or more of the described components can be completely removed from the system, so long as one or more operations described in correspondence to a removed component can be compensated for by one or more other components, or a third-party resource.

The exemplary dataset analysis component 212 can process a statistical analysis on one or more image datasets to generate a result that includes, among other things, percentages and/or ranges of various camera calibration parameters that are generally observed in a variety of digital images taken with a camera. In this regard, the result of the statistical analysis can demonstrate an average distribution of different camera calibration parameters or configurations typically employed by a general population of photographers.

The panoramic image receiving component 214 receives a panoramic image, such as a 360-degree panoramic image, from which to generate a training image dataset utilized to train the convolutional neural network of neural network host 230. The panoramic image can depict a wide variety of scenes, preferably one having a horizon depicted therein. The panoramic image receiving component 214 can retrieve and/or receive a panoramic image from a memory or database, the Internet, or a client device such as client device 120 of FIG. 1.

The parameter range defining component 216 receives a result of a statistical analysis performed on one or more image datasets, such as one generated by the exemplary dataset analysis component 212, to define plausible ranges or other camera calibrations when extracting a plurality of different images from a panoramic image. The panoramic image can be received via a panoramic image receiving component, such as the one received by panoramic image receiving component 214. By way of example, the result of the statistical analysis may provide that any image in a given dataset may have a determined likelihood of being captured: in landscape orientation versus in portrait orientation; with one of a plurality of known aspect ratios based on a determined probability of occurrence; with a focal length occurring within a determined distribution, with a camera pitch occurring within a determined distribution, and with a camera roll occurring within a determined distribution. These plausible camera calibrations determined from the statistical analysis result can be employed by the parameter range defining component 216 to define a set of rules that facilitates a random selection of a plausible set of camera calibrations.

The dataset extraction component 218 can receive a defined set of rules, such as one generated by the parameter range defining component, to extract a plurality of unique digital images from the panoramic image. The defined set of rules can be employed by a random number generator, such as random number generator 220, that can generate a set of randomly-selected camera calibration parameters that includes, in essence, a template to extract a unique image from the panoramic image. An extracted digital image and its corresponding set of camera calibration parameters, generated to extract the image, can be retained in association for eventual provision to the neural network host 230, for training the convolutional neural network, among other things.

To better describe the extraction process, an exemplary model for identifying horizontal and vertical focal lengths and a rotational calibration of a camera that captured a particular digital image is provided. Employing a simplified pinhole camera model that links the three-dimensional space to the image plane, such that for any point $[X, Y, Z]^T \in \mathbb{R}^3$ in three-dimensional space, a corresponding position in image plane $$[u, v] = \left[\frac{u'}{s}, \frac{v'}{s}\right]$$

can be determined as:

$$\begin{bmatrix} u' \\ v' \\ s \end{bmatrix} = \begin{bmatrix} f_x & 0 & 0 & 0 \\ 0 & f_y & 0 & 0 \\ 0 & 0 & 1 & 0 \end{bmatrix} \begin{bmatrix} & & & 0 \\ & R_{3\times 3} & & 0 \\ & & & 0 \\ 0 & 0 & 0 & 1 \end{bmatrix} \begin{bmatrix} X \\ Y \\ Z \\ 1 \end{bmatrix},$$

where $f_x$ and $f_y$ are the focal lengths in the two directions x and y of the image plane, and $R_{3\times 3}$ is the rotation matrix of the camera describing the camera viewing angle. In further embodiments, radial distortion may also be included in the foregoing model to account for various lens effects relating to imperfect alignments of optic elements in a lens. In this regard, a Brown-Conrady model describing how a given undistorted pixel with index $(u_u, v_u)$ in an image is moved to a distorted position $(u_d, v_d)$. Thus, for an image having a principal point $(u_c, v_c)$, the distortion can be computed as:

$$u_d = \frac{u_u + u_c(K_1 r^2 + K_2 r^4)}{1 + K_1 r^2 + K_2 r^4},$$

where the radius $r=\sqrt{(u_u-u_c)^2+(v_u-v_c)^2}$ corresponds to a distance between the distorted pixel index and the digital image's principal point. Provided the foregoing, the same computation can also be performed for axis v.

Looking now at the neural network host 230, the neural network host 230 can include, among other things, a dataset receiving component 232, a parameter encoding component 234, a training component 236, an analyzing component 238, a confidence determining component 240, and an output generating component 242. As each of the described components are depicted as being included in the neural network host 230, it is contemplated that any component depicted therein is not limited to the illustrated embodiment, and can be distributed among a plurality of components or computing devices, or in some instances, may be conflated into a single component or module, such as a processor. It is also contemplated that any one or more of the described components can be completely removed from the system, so long as one or more operations described in correspondence to a removed component can be compensated for by one or more other components, or a third-party resource. Further, while no specific component is depicted corresponding to the convolutional neural network itself, it is understood that the convolutional neural network is comprised of or interfaces with one or more of the components depicted in neural network host 230. In this regard, a reference to the neural network host 230, or the components thereof, can also correspond to the convolution neural network described in accordance with various embodiments herein.

The dataset receiving component 232 receives one or more training image datasets from any one of an image dataset generator, such as image dataset generator 210, an external or an internal memory, a network such as network 130 of FIG. 1, or a client device such as client device 120 of FIG. 1. As was described herein, each received training dataset includes a corresponding plurality of training images that were each extracted from a single panoramic image and having a corresponding set of camera calibration parameters determined therefore at random.

The parameter encoding component 234 defines a ruleset that specifies how each of the various camera calibration parameters (e.g., intrinsic parameters, extrinsic parameters) are determined (i.e., estimated) by convolutional neural network of the neural network host 230. In accordance with embodiments described herein, each of the parameters are estimated by the neural network host 230 as a discrete probability distribution over a defined range. In an embodiment, each of the determined distributions can be discretized (i.e., divided) into two-hundred and fifty-six (256) bins (e.g., possible outputs), though various other numbers of bins may be considered within the purview of the present disclosure. In some embodiments, a determined distribution can be discretized equally or variably, depending on the distribution being modeled. For instance, a determined distribution can be discretized in an adaptive manner (e.g., variably), such that one or more areas of the distribution include a higher or a lower concentration of bins around a particular value or subrange of the defined range. By way of example only, to represent a distribution of camera roll from −45 degrees to 45 degrees, the bins may not be equally divided over this range. In this regard, a higher concentration of bins may be allocated around the −10 to 10 degrees range, accounting for the fact that camera roll is not a common characteristic of digital images typically taken by a camera. By discretizing the distributions into bins, as described, a convolutional neural network, as implemented in the neural network host 230, can generate an output of probabilities calculated for each discretized value within the defined range.

By employing a scheme as described, as opposed to one implemented by way of a standard regression, the ability to identify uncertainties in the determination process is facilitated. For instance, as calculated probabilities decrease for various bin outputs, or if multiple probabilities may appear higher for various bin outputs, the discretized scheme enables an output, such as the histogram 250 depicted in FIG. 2, to be analyzed (e.g., by a human or a computing device) for further analysis. In essence, the parameter encoding component 234 encodes each parameter scheme into the neural network with various definitions that can each facilitate, at least in part, the determination of a camera calibration parameter based on one or more image characteristics that can be detected by the convolutional neural network hosted by neural network host 230.

By way of a non-limiting example, to determine at least the horizontal and vertical focal lengths along with the rotational calibration of a camera for a particular image, the rotation matrix $R_{3\times3}$ described herein above can be employed to extract three angles of rotation, such as an azimuth, a pitch, and a roll. As one of ordinary skill in the art may appreciate, an azimuthal angle (e.g., cardinal direction) can generally not be determined from a single image. In this regard, the pitch and roll can be employed to encode the camera viewing direction. As a position of a horizon in an image ($b_m$) depends not only on the camera's angles of rotation, but also its field of view, a horizon midpoint in image ($b_m$) having a height (h) and vertical field of view ($\alpha$), can be analytically derived from the camera pitch ($\theta$) as:

$$b_{im} = f_{im} \cdot \tan(\theta) + 0.5,$$

where $f_{im}$ is the focal length in image unit:

$$f_{im} = \frac{1}{2 \cdot \tan\left(\frac{\alpha}{2}\right)}.$$

Provided the foregoing, a horizon position in an image depends on both the camera field of view and the camera pitch. As an ordinary person skilled in the art may also appreciate, a horizon can appear at the same position on two very different pictures. For instance, a first picture may have a small field of view with a small pitch angle, while a second picture may have a large field of view with a larger pitch angle. As such, a correct estimation of both a focal length (i.e. field of view) and a horizon position must be correctly estimated in order to correctly estimate the camera pitch. To this end, an angle representation for a camera pitch is dependent on two estimations (e.g., focal length and horizon position). Instead of encoding a camera viewing direction as an angle, a horizon position of an image is predicted (e.g., estimated, determined) independently from the focal length. The horizon position can be represented in accordance with various embodiments as an "image unit." A value of zero (0) can be employed to represent a horizon positioned on a bottom row of an image, while a value of one (1) can be employed to represent a horizon positioned on a top row of the image, by way of example. It is noted that the foregoing examples are merely specific to one implementation of an embodiment described herein, and various representations and ranges may be employed in accordance with various embodiments without limitation to those described.

Moving forward, in some embodiments, an assumption can be made that vertical and horizontal focal lengths of a digital image can be directly related in terms of an aspect ratio of the digital image. In other words, the assumption is based on every pixel of the image being squared. In this regard, for a digital image captured in landscape orientation having a 3:4 aspect ratio, it is expected that the horizontal field of view is 1.333333333 ("4/3rds") times the vertical field of view. As such, an estimation of one field of view measure, such as the vertical field of view, is necessary at a minimum to determine a corresponding opposing field of view measure, such as a horizontal field of view. A range of this vertical field of view distribution can be defined, for example [0.2, 1.8], which can be arbitrarily defined, or derived from the result of the statistical analysis performed by exemplary dataset analysis component 212, by way of non-limiting example.

In some further embodiments, a horizon position can be encoded in an "image unit" distribution, as described herein above, with a range of [−0.6, 1.6] by way of a non-limiting example. Although it was described above that a horizon position at a bottom row of an image may have a value of zero (0), or a value of one (1) when at a top row of the image, a broader range may be defined to account for horizon positions that are located under (e.g., less than zero) or over (e.g., greater than one) the image boundaries.

Figure 3:
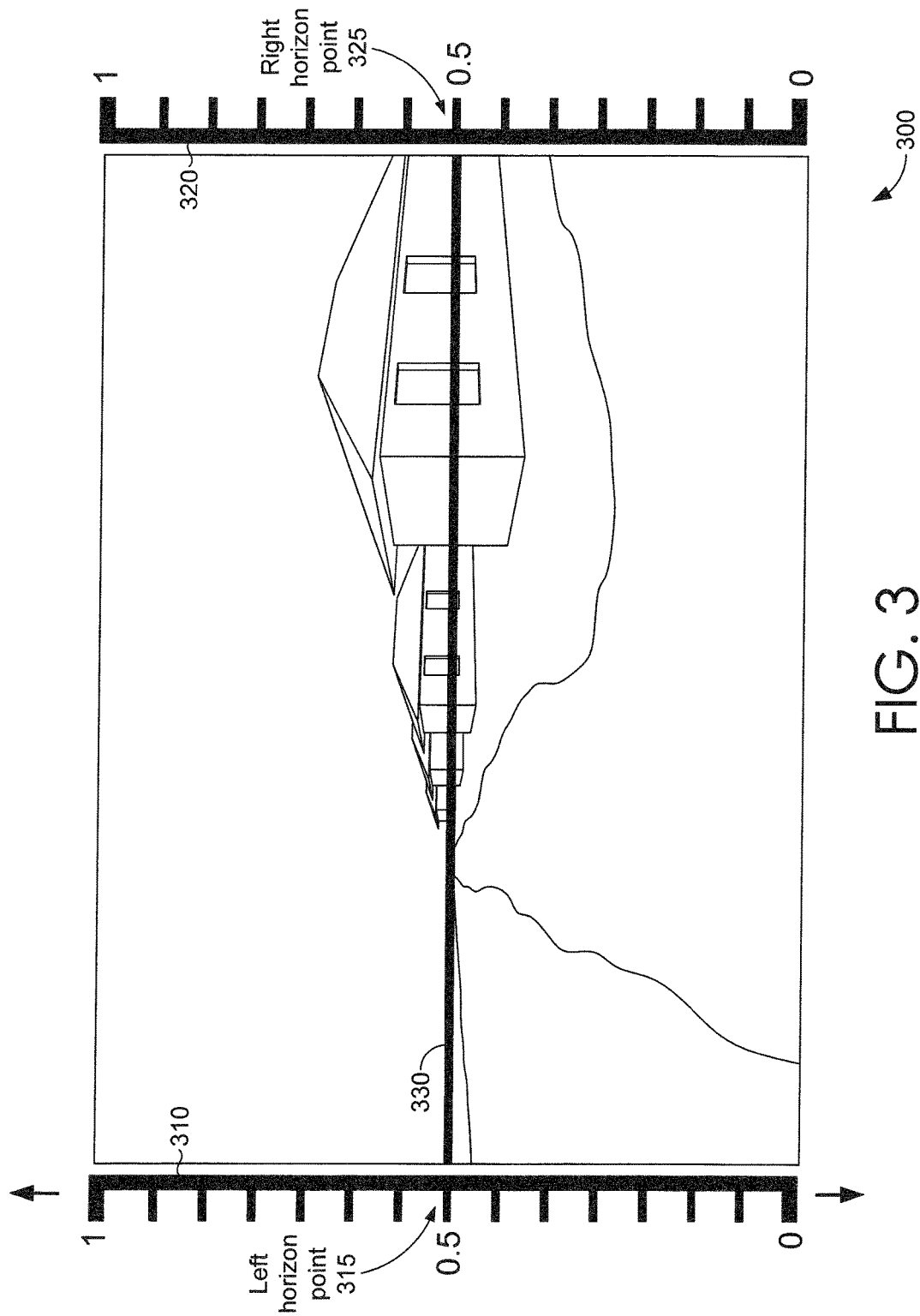
FIG. 3 is an illustration of a digital asset having annotations that depict determinable left and right horizon points in accordance with some embodiments of the present invention.

In some further embodiments, a camera roll can be encoded as a function of two horizon positions determined by the convolutional neural network of neural network host 230. With brief reference to FIG. 3, an exemplary image 300 is depicted having annotations on the left 310 and right 320 boundaries of the image detailing evident left 315 and right 325 intersecting positions of the image horizon 330 with the left 310 and right 320 image boundaries, respectively. Provided with left 315 and right 325 horizon points of a digital image, such as image 300, both being depicted in the image 300 at a center point (0.5) 315, 325, a horizon line 330 can be extrapolated as a function (e.g., straight line) of the intersecting points 315, 325. More particularly, a left intersection point 315 with a left boundary 310 of a digital image, and a right intersection point 325 with a right boundary 320 of the digital image 300, can collectively be detected and employed to extrapolate and define a horizon line 330 that passes through, or in some instances above or below, a digital image 300.

Figure 4:
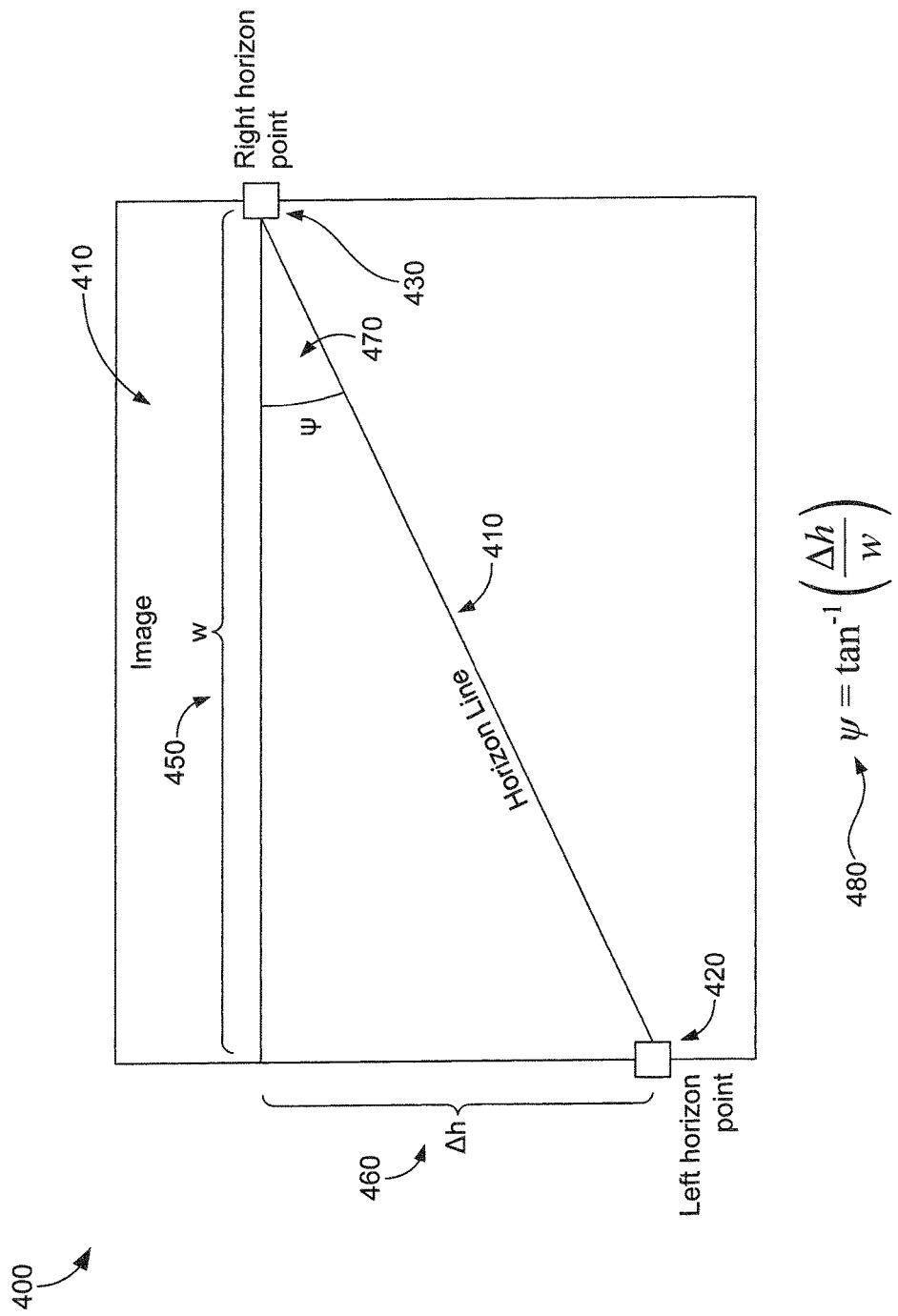
FIG. 4 is a schematic diagram of an exemplary digital asset having detectable characteristics that are employable to determine camera calibration parameters according to some embodiments of the present invention.

Looking now to FIG. 4, a schematic diagram 400 of an exemplary digital image 410 having detectable characteristics, such as left 420 and right 430 horizon points, is depicted. In reference to the equation described above regarding the derivation of a horizon midpoint from a digital image, knowing that a horizon midpoint of digital image ($b_m$) 410 having a height (h) 460 and a vertical field of view ($\alpha$) determined based on at least a portion (e.g., width 450) of a determined image aspect ratio, it is clear that the horizon midpoint can be analytically derived from a camera pitch as:

$$b_{im} = f_{im} \cdot \tan(\theta) + 0.5,$$

In this regard, a camera pitch for a digital image can be determined based at least in part on the factors extrapolated from the detected left 420 and right 430 horizon points, determined aspect ratio, and a measured width 450 or height of an image, in accordance with embodiments described herein. Moreover, provided the foregoing, the camera roll 470 for the digital image 410 can further be determined using the relation:

$$\phi = \tan^{-1}\left(\frac{r-l}{w}\right),$$

which is also depicted in equation 480 of FIG. 4.

With reference back now to FIG. 2, the training component 236 of neural network host 230 can provide the one or more training image datasets, generated by image dataset generator 210 for example, to the convolutional neural network of neural network host 230. The training component 236 provides the convolutional neural network with the one or more training image datasets to establish high confidence relationships between detectable characteristics of the training images and their known corresponding sets of camera calibration parameters, in accordance with the defined parameter scheme, such as one defined by parameter encoding component 234. In essence, the training component 236 is providing reinforcing data, to the convolutional neural network, such that detectable characteristics of a digital image are determined to correspond to certain camera calibration parameters. In general terms, this reinforced learning process may require one or more substantially sized training image datasets to establish strong correlations between various camera calibration parameters and detectable characteristics of a digital image to develop a strong "intuition," so to speak.

In various embodiments, the convolutional neural network of neural network host 230 can receive the one or more training image datasets and, in accordance with the defined parameter scheme, begin analyzing each digital training image along with its corresponding set of camera calibration parameters such that any number of its convolutional neural network "neurons," responsible for generating outputs based on its prior "knowledge" learned from prior tasks, can be modified for improved accuracy. As one of ordinary skill in the art may appreciate, each neuron in a convolutional neural network can be tuned to increase overall accuracy when training data is provided. The training data provides, in essence, a correct answer to the convolutional neural network and its neurons such that over time, the convolutional neural network can begin tuning the computations computed within each neuron to eventually find a correct answer on its own. In this way, any one or more neural network neurons of the neural network host 230 can be modified based at least in part on received training image data.

The analyzing component 238 of the neural network host 230 can comprise multiple layers of a convolutional neural networking architecture. For instance, in some embodiments, a first architectural layer can be employed to determine a left horizon point of a digital image, a second architectural layer can be employed to determine a right horizon point of the digital image, and a third architectural layer can be employed to determine a vertical field of view of the digital image. Each ruleset defined by the parameter encoding component 234 is employable by the neural network host 230, or more particularly the analyzing component 238, to define the analytic process for employment by the convolutional neural network.

In brief reference to the description relating to the parameter encoding component 234, each of the parameters are estimated by the neural network host 230 as a discrete probability distribution over a defined range. In a described embodiment, each of the determined distributions can be discretized (e.g., divided) into a plurality of bins (e.g., two-hundred and fifty-six (256) bins) or "possible outputs," by way of example. By discretizing the distributions into bins, the neural network host 230 can generate an output of probabilities calculated for each discretized value within the defined range. To this end, each architectural layer can include a corresponding plurality of convolutional neural network neurons that are each mapped to one of a plurality of discretized bins associated with a particular detectable image characteristic.

In accordance with some embodiments, a first architectural layer can include a first corresponding plurality of convolutional neural network neurons that are each mapped to a first set of discretized bins that can be associated with a left horizon point of a digital image. Each bin in the first set can represent a corresponding measurement included within a defined range of plausible left horizon points within a digital image. As was also described herein with respect to the parameter encoding component 234, in an embodiment, a horizon position can be encoded in an "image unit" distribution, having a range of [−0.6, 1.6]. Thus, each bin in the first set can correspond to a discretized unit within the defined range. By way of example, if the image unit distribution is discretized (e.g., divided) into two-hundred and fifty-six (256) bins, the first bin of the first set will correspond to a left horizon point of −0.6, and the last bin (e.g., the $256^{th}$ bin) will correspond to a left horizon point of 1.6, with each bin there between corresponding to a left horizon point at equally-divided portions within the defined range.

Similarly, in accordance with some embodiments, a second architectural layer can include a second corresponding plurality of convolutional neural network neurons that are each mapped to a second set of discretized bins that can be associated with a right horizon point of a digital image. Each bin in the second set can represent a corresponding measurement included within a defined range of plausible right horizon points within a digital image. Following from the previous example, if the image unit distribution is discretized (e.g., divided) into two-hundred and fifty-six (256) bins, the first bin of the second set will correspond to a right horizon point of −0.6, and the last bin (e.g., the $256^{th}$ bin) will correspond to a right horizon point of 1.6, with each bin there between corresponding to a right horizon point at equally-divided portions within the defined range.

Moreover, in accordance with some embodiments, a third architectural layer can include a third corresponding plurality of convolutional neural network neurons that are each mapped to a third set of discretized bins that can be associated with a vertical field of view of a digital image. Each bin in the third set can represent a corresponding measurement included within a defined range of vertical field of views within a digital image. As was described herein with respect to the parameter encoding component 234, in an embodiment, a vertical field of view measure can be encoded as a function of a digital image aspect ratio, having a range of [0.2, 1.8], by way of example. Thus, each bin in the third set can correspond to a discretized unit within the defined range. Thus, in addition to the previous two examples, if the vertical field of view distribution is discretized (e.g., divided) into two-hundred and fifty-six (256) bins, the first bin of the third set will correspond to a smallest vertical field of view measure at 0.2, and the last bin (e.g., the $256^{th}$ bin) will correspond to a largest vertical field of view measure at 1.8, with each bin there between corresponding to a vertical field of view measure at equally-divided portions within the defined range. Following, in accordance with the exemplary embodiment described above, each of the architectural layers of the neural network host 230 can be configured to perform a particular task, such as detecting a particular characteristic of a digital image, among other things.

In some other embodiments, a pre-existing convolutional neural network may be modified to perform various aspects described in accordance with the present disclosure with relative ease. For instance, some existing neural network architectures may have a substantial amount of pre-training that has significantly improved their ability to perform various tasks, such as object recognition for example. Such neural network architectures may have useful operations, including edge detection, shape detection, and the like. In this regard, as these operations have developed improved image characteristic determination performance based on having a longer history of training, architectural layers such as those described above for performing tasks related to embodiments described herein, may be implemented into a pre-existing convolutional neural network host. By way of example, taking a convolutional neural network optimized for object detection, a last architectural layer thereof, typically employed to map a detected object to a number of bins that each represent one of a plurality of recognized objects, may be removed and replaced with the three exemplary architectural layers described herein above. As the added architectural layers augment a convolutional neural network with an already-learned skillset for detecting various features throughout a digital image, overall performance of the modified convolutional neural network for performing the task of determining camera calibration parameters of images may be significantly improved in accordance with various embodiments.

Moving on, the confidence determining component 240 of the neural network host 230 can calculate a confidence level based on a likelihood that a detected image characteristic corresponds to one of the plurality of corresponding bins. That is, by way of example, having a first set of convolutional neural network neurons tasked to analyze a left boundary of a digital image, each possible left horizon point along a digital image is analyzed, such that based on results of that analysis, the confidence determining component 240 can calculate a likelihood or confidence level that the left horizon point is actually "the" left horizon point of the digital image. More specifically, a confidence level can be calculated for each possible value of detectable characteristics within the defined range of possible values based on detected characteristics of the digital image. In this way, the ability to identify uncertainties or errors in the determination process is facilitated.

The output generating component 242 of neural network host 230 can employ calculated confidence levels or probabilities for each possible value in a defined range of possible values, such as those determined by the confidence determining component 240 for example. The output generating component 242 can generate, among other things, raw data for subsequent analysis, or visual data that can be provided for display, such as histogram 250 by way of example. An exemplary depiction of a histogram 250 generated by the output generating component 242 is shown, including an x-axis 254 distribution value and a y-axis 252 confidence value. Other graphical representations and configurations for depicting the raw data (e.g., confidence values or probabilities for each plausible value) are also considered within the purview of the present disclosure. A confidence value or probability can be determined based on a statistical analysis performed on the raw data or visual data. By way of example, a histogram having lower variance may be more determined more accurate as opposed to one having higher variance.

In the depicted histogram 250, an exemplary set of confidence levels or probabilities are shown for a horizon point (e.g., left or right) of a digital image analyzed by the convolutional neural network described in accordance with some embodiments of the present disclosure. In accordance with various embodiments, these levels or probabilities can be converted into a single estimate. For instance, a value with the highest probability can be selected, or a weighted average can be calculated. In essence, the single estimate provides a determined confidence that a determined set of camera calibration parameters is accurate. Depicted on the histogram 250 are x-axis 254 values that correspond to each discretized bin between the range of [−0.6, 1.6], and y-axis 252 values that correspond to a calculated confidence value representing a likelihood that a horizon point is, in fact, "the" horizon point (e.g., left or right) for the analyzed digital image. According to the depicted histogram, one can visually determine that while several of the potential horizon points generate a spike in confidence value, the highest calculated confidence value 260 occurs at a horizon point at approximately 1.25. While not described further in detail, it is contemplated that a particular likely value of a detectable characteristic can be selected, by the neural network host 230, to make a final determination based on a variety of factors, including a highest calculated confidence value, exceeding a threshold confidence value, a percentage or value difference threshold between a highest calculated confidence value and one or more other calculated confidence values, and more.

Figure 5:
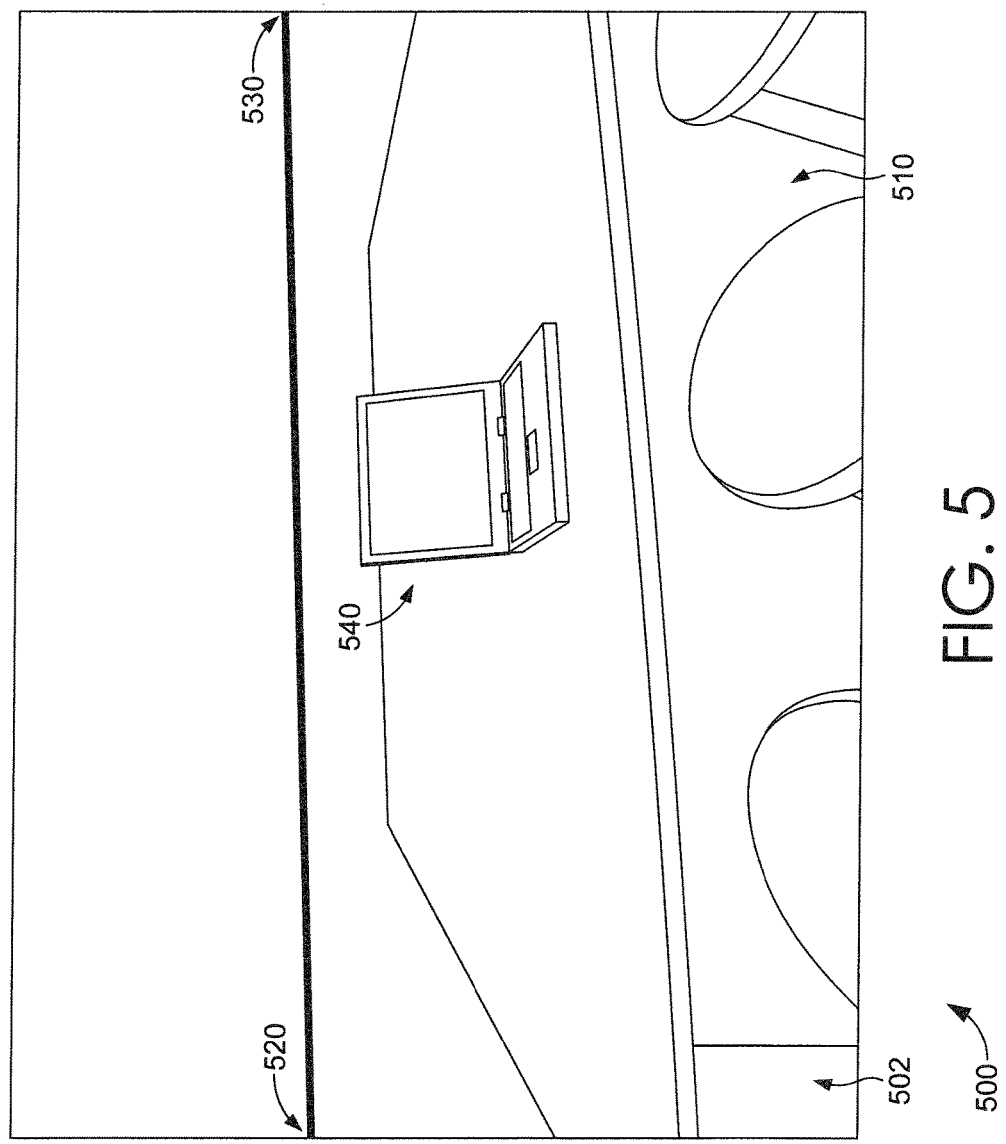
FIG. 5 is an illustration of a digital asset scene depicting a virtual three-dimensional object (e.g., a laptop computer) composited therein, in accordance with some embodiments of the present invention.

Looking now at FIG. 5, an illustration 500 of an exemplary implementation of some embodiments described herein is provided. Provided in the illustration 500 is a digital image 502 depicting a scene 510. The depicted scene 510 is captured in digital image 502, though a virtual three-dimensional representation of a laptop computer 540 is composited therein. As depicted in the scene 510 are likely left 520 and right 530 horizon points that are detectable by a convolutional neural network, such as one described in accordance with embodiments of the present disclosure. By employing a convolutional neural network system, such as system 200 of FIG. 2, a convolutional neural network can be trained, configured, and employed to optimally and automatically determine a set of camera calibration parameters (e.g., intrinsic and/or extrinsic) employable to accurately render a virtual three-dimensional object and composite the object into a digital image with realism, such as the virtual three-dimensional representation of the laptop computer 540 depicted in image 502. Given an accurate set of camera calibration parameters, such as those determined from a digital image by embodiments described herein, a virtual object can be composited in various positions, rotational configurations, or orientations, within a digital image while maintaining a realism in accordance with the static parameters of the underlying digital image. While the illustrated embodiment relates to three-dimensional virtual objects, it is contemplated that two-dimensional images can also be composited employed various embodiments described herein. For instance, a search engine having logic employing various embodiments described herein may identify other images having similar or identical perspectives. Further, various embodiments described herein may also facilitate a determination of camera calibration parameters of one or more images, which can provide the necessary information needed to accurately warp the one or more images to match a perspective of another image, among other things. Such information may, in some embodiments, be employed in various structure-for-motion (SfM) techniques for scene reconstruction, by way of example.

Figure 6:
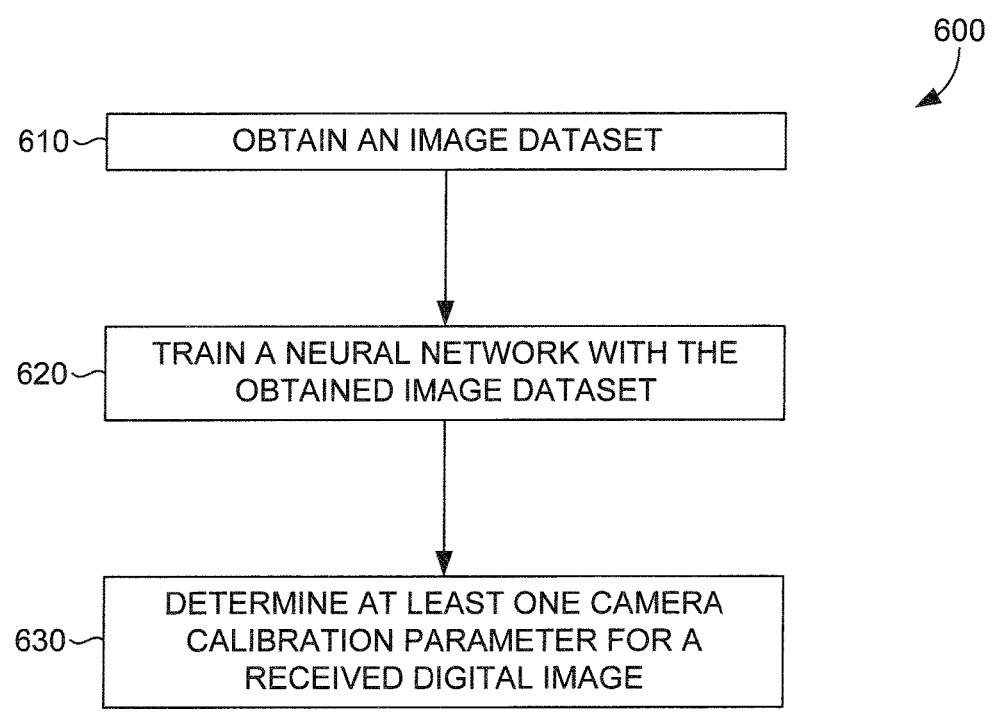
FIG. 6 is a flow diagram showing a method for determining camera calibration parameters of a digital asset in accordance with some embodiments of the present invention.

Turning now to FIG. 6, a flow diagram is provided that illustrates a method for determining camera calibration parameters of a digital image. At block 610, a training image dataset is obtained. The training image dataset can be obtained from an image dataset generator, such as image dataset generator 210 of FIG. 2, which can generate a plurality of different digital images from a single panoramic digital image. The panoramic digital image can include a 360-degree panoramic image, which facilitates a single data source from which a large training image dataset can be extracted in an optimal fashion. Each training image included in the training image dataset is associated with a corresponding set of camera calibration parameters that were generated at random to determine how the training image was to be extracted from the single panoramic image. In this way, each image and its corresponding set of camera calibration parameters can provide at least a portion of training image data that reinforces learning in a convolutional neural network as described.

At block 620, a convolutional neural network, such as one hosted by neural network host 230, can be trained based on one or more obtained training image datasets. As described, by virtue of the training image data having corresponding sets of known camera calibration parameters, a convolutional neural network can analyze each digital image in the training image data, along with its corresponding set of known camera calibration parameters, to establish high-confidence correlations between detectable image characteristics to a plausible set of camera calibration parameters. In embodiments, the convolutional neural network can include a plurality of convolutional network neurons. As training image data is being analyzed, one or more of the convolutional network neurons involved in the process of determining correlations between detected image characteristics of a digital image and its corresponding set of camera calibration parameters, can be modified to account for errors predicted first without the corresponding set of camera calibration parameters. The modifications can include changes to computations made by each neuron in at least a portion of the convolutional network neurons associated with the correlation determining process.

In some embodiments, each of the convolutional neural network neurons are each mapped to one of a plurality of discretized bins. In accordance with some embodiments, the convolutional network neurons can each correspond to a particular neural network architectural layer tasked with a specific objective. Each convolutional network neuron can also be mapped to a particular bin in a plurality of bins that represent a distribution of plausible values for a detectable image characteristic. The plausible values for the detectable image characteristics can be employed to estimate one or more of camera calibration parameters of a digital image, in accordance with embodiments described herein.

At block 630, the convolutional neural network can determine one or more calibration parameters for a received digital image based on one or more detected image characteristics of the received digital image, and further based on the "training" that the convolutional neural network received in account of the analyzed training image data. In some embodiments, the convolutional neural network can also generate a confidence value for each plausible value determined based on detected characteristics of a provided image. In some embodiments, for each type of camera parameter being determined, a plausible value having a highest confidence value calculated by the convolutional neural network can be selected for inclusion in a set of image parameters associated with the digital image being analyzed. The confidence values for each of these parameters can be individually provided, or aggregated to provide a single confidence level that the set of parameters is accurate for the provided digital image. In some instances, raw data or visual data can be generated by the convolutional neural network for further analysis and consumption in accordance with some of the described embodiments.

Figure 7:
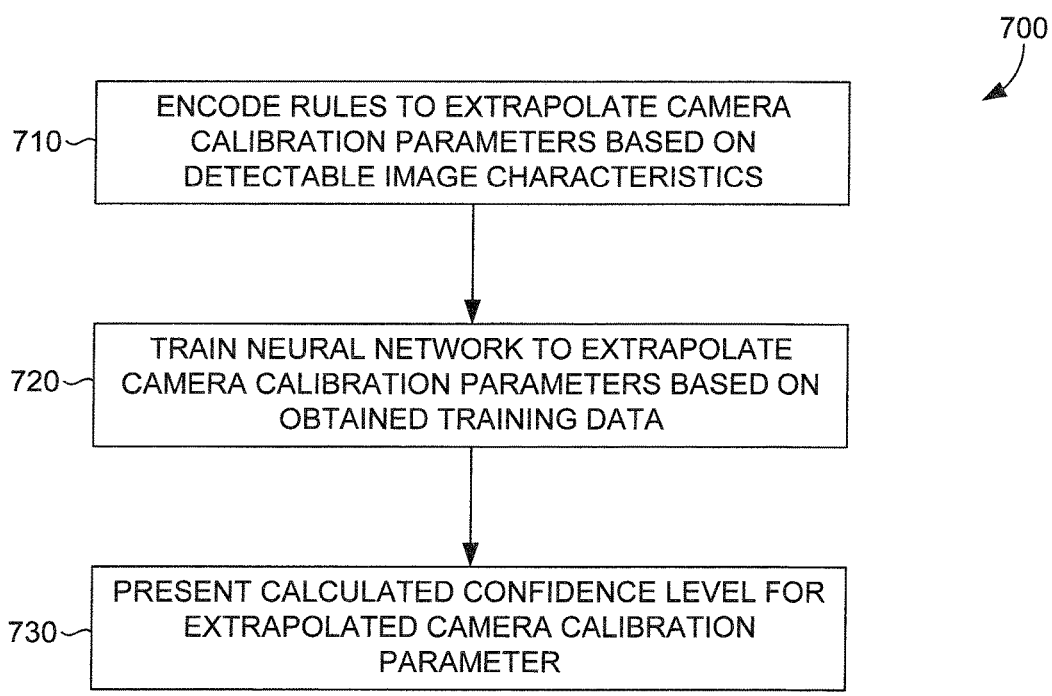
FIG. 7 is a flow diagram showing another method for determining camera calibration parameters of a digital asset in accordance with some embodiments of the present invention.

Turning now to FIG. 7, a flow diagram is provided that illustrates another method for determining camera calibration parameters of a digital image. As described herein, a plurality of different digital images is extracted from one or more digital panoramic images to generate one or more training datasets for a convolutional neural network, such as one implemented in neural network host 230. More specifically, a set of camera calibration parameters is randomly generated within a range of plausible calibration parameters. The range of plausible camera calibration parameters can be determined based on a statistical analysis performed on one or more different image datasets, with the purpose of determining a likely range of camera calibration parameters employed when capturing an image with a camera. For each set of camera calibration parameters generated, a digital image is cropped from a corresponding panoramic digital image based on the set of camera calibration parameters generated for the digital image. In this way, each digital image, having a limited field of view, is associated with a known corresponding set of camera calibration parameters. Generating one or more large training image datasets having a plurality of different digital images by way of the described technique can provide an optimal method to generate training data for a convolutional neural network, such as one described herein.

At block 710, a parameter scheme is encoded into the convolutional neural network, essentially defining the relationships between detectable characteristics of a given digital image and one or more camera calibration parameters that can be extrapolated therefrom. The parameter scheme can include a plurality of determinable camera calibration parameters, such as focal length, horizon position, camera roll, or camera pitch, among other things. The parameter scheme can define how detectable image characteristics, such as aspect ratio of the digital image, height or width of the digital image, left horizon point, right horizon point, and other characteristics determinable from the digital image, can be employed to extrapolate and estimate one or more of the determinable camera calibration parameters.

At block 720, the plurality of different training images extracted in block 710 along with their corresponding sets of randomly-generated camera calibration parameters can be provided to the convolutional neural network as training image data. Because each digital image in the one or more training image datasets is associated with a corresponding set of known camera calibration parameters, this training image data can be consumed by the convolutional neural network to reinforce high confidence relationships between detectable characteristics of digital images and their corresponding camera calibration parameters.

At block 730, a digital image that has never been seen or analyzed by the convolutional neural network can be provided to the convolutional neural network trained based on the provided training image data. The convolutional neural network can generate outputs, based on its reinforced knowledge and detected characteristics of the digital image, that correspond to a confidence level calculated for each detected image characteristic and/or camera calibration parameters determined or extrapolated based on one or more of the detected image characteristics. For each type of detectable image characteristic or camera calibration parameter determinable therefrom, a confidence level can be calculated for each plausible value within a range of plausible values that correspond to the image characteristic or type of camera calibration parameter. In some instances, a single plausible value associated with a highest calculated confidence level can be selected as a most likely value for the image characteristic or type of camera calibration parameter. One or more of the calculated confidence values described herein can be presented or provided for display by the convolutional neural network or a host computing device associated therewith. In some instances, the calculated confidence values can be provided as raw data for further analysis and/or presented in graphical form, such as histogram 250 of FIG. 2. In this regard, the raw data and/or visual representation of confidence values can provide useful data to identify levels of overall confidence for the determined camera calibration parameters.

Figure 8:
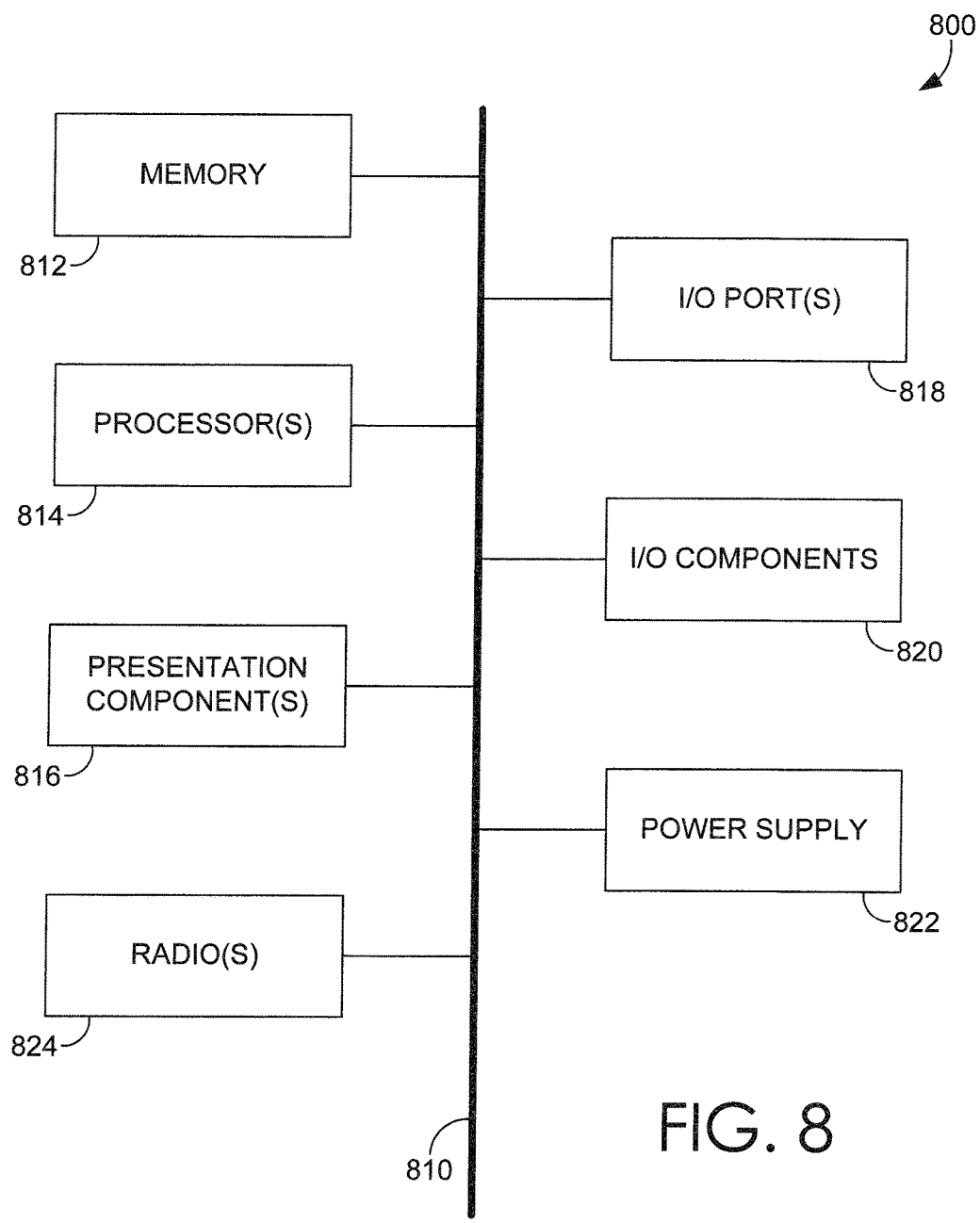
FIG. 8 is a block diagram of an exemplary computing environment suitable for use in implementing some embodiments of the present invention.

Having described embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

As can be understood, embodiments of the present invention provide for, among other things, hosting a plurality of copies of a digital content. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer storage medium storing computer-useable instructions that, when used by at least one processor, cause the at least one processor to perform operations comprising:
obtaining a training image dataset that includes at least a first set of different digital images, each digital image in at least the first set of different digital images having a corresponding set of camera calibration parameters of the digital image;
detecting a first set of image characteristics for each digital image in at least the first set of different digital images, the image characteristics including a corresponding left horizon position, a corresponding right horizon position, and a corresponding vertical field of view, wherein the corresponding vertical field of view is determined based on a corresponding aspect ratio of the digital image;
modifying at least a portion of a plurality of convolutional neural network neurons mapped to a plurality of discretized bins based on the detected image characteristics of at least the first plurality of different digital images and each corresponding set of camera calibration parameters, wherein each discretized bin of the plurality of discretized bins corresponds to one of the image characteristics; and
determining at least one camera calibration parameter for a received digital image based on a second set of detected image characteristics of the received digital image and at least the modified portion of the plurality of convolutional neural network neurons.

2. The non-transitory computer storage medium of claim 1, wherein each digital image in the first set of different digital images is extracted from a single panoramic digital image.

3. The non-transitory computer storage medium of claim 2, wherein each digital image is extracted from the single panoramic digital image based on a random-selection of each camera calibration parameter generated for inclusion in the corresponding set of camera calibration parameters.

4. The non-transitory computer storage medium of claim 3, wherein the random-selection of each camera calibration parameter is generated within a corresponding camera calibration parameter range in a plurality of camera calibration parameter ranges determined based on a statistical analysis conducted on one or more digital image datasets.

5. The non-transitory computer storage medium of claim 1, wherein the corresponding set of camera calibration parameters includes at least one of the corresponding aspect ratio, a corresponding focal length, a corresponding camera pitch, and a corresponding camera roll.

6. The non-transitory computer storage medium of claim 5, wherein the determined at least one camera calibration parameter for the received digital image includes at least one of a focal length of the received digital image, a camera pitch of the received digital image, and a camera roll of the received digital image.

7. The non-transitory computer storage medium of claim 1, wherein each discretized bin of the plurality of discretized bins corresponds to a probability distribution associated with one of the image characteristics.

8. The non-transitory computer storage medium of claim 7, the operations further comprising:
generating, for each discretized bin of the plurality of discretized bins, an output from the corresponding convolutional neural network neuron based at least in part on a probability calculated for the corresponding image characteristic.

9. The non-transitory computer storage medium of claim 8, the operations further comprising:
providing for display a representation of data generated based on at least one of the generated outputs associated with at least one of the plurality of discretized bins.

10. A computer-implemented method for determining camera calibration parameters comprising:
obtaining, by a computing device, a training image dataset that includes at least a first set of different digital images, each digital image in at least the first set of different digital images having a corresponding set of camera calibration parameters associated with the digital image;
detecting, by the computing device, a first set of image characteristics for each digital image in at least the first set of different digital images, the image characteristics including a corresponding left horizon position, a corresponding right horizon position, and a corresponding vertical field of view, wherein the corresponding vertical field of view is determined based on a corresponding aspect ratio of the digital image;
modifying, by the computing device, at least a portion of a plurality of convolutional neural network neurons mapped to a plurality of discretized bins based on the detected image characteristics of at least the first plurality of different digital images and each corresponding set of camera calibration parameters, wherein each discretized bin of the plurality of discretized bins corresponds to one of the image characteristics; and
determining, by the computing device, at least one camera calibration parameter for a received digital image based on a second set of detected image characteristics of the received digital image and at least the modified portion of the plurality of convolutional neural network neurons.

11. The method of claim 10, wherein each digital image in the first set of different digital images is extracted from a single panoramic digital image.

12. The method of claim 11, wherein each digital image is extracted from the single panoramic digital image based on a random-selection of each camera calibration parameter generated for inclusion in the corresponding set of camera calibration parameters.

13. The method of claim 12, wherein the random-selection of each camera calibration parameter is generated within a corresponding camera calibration parameter range in a plurality of camera calibration parameter ranges determined based on a statistical analysis conducted on one or more digital image datasets.

14. The method of claim 10, wherein the corresponding set of camera calibration parameters includes at least one of the corresponding aspect ratio, a corresponding focal length, a corresponding camera pitch, and a corresponding camera roll.

15. The method of claim 10, wherein the determined at least one camera calibration parameter for the received digital image includes at least one of a focal length of the received digital image, a camera pitch of the received digital image, and a camera roll of the received digital image.

16. The method of claim 10, wherein each discretized bin of the plurality of discretized bins corresponds to a probability distribution associated with one of the image characteristics.

17. The method of claim 16, further comprising:
generating, by the computing device for each discretized bin of the plurality of discretized bins, an output from the corresponding convolutional neural network neuron based at least in part on a probability calculated for the corresponding-image characteristic.

18. The method of claim 17, further comprising:
providing for display, by the computing device, a representation of data generated based on at least one of the generated outputs associated with at least one of the plurality of discretized bins.

19. The method of claim 10, wherein the at least one camera calibration parameter is determined based further on an encoded parameter scheme.

20. A computerized system comprising:
a dataset receiving means for receiving a training image dataset that includes at least a first set of different digital images, each digital image in at least the first set of different digital images having a corresponding set of camera calibration parameters associated with the digital image;
a neural network training means for
detecting a first set of image characteristics for each digital image in at least the first set of different digital images, the image characteristics including a corresponding left horizon position, a corresponding right horizon position, and a corresponding vertical field of view, wherein the corresponding vertical field of view is determined based on a corresponding aspect ratio of the digital image, and
modifying at least a portion of a plurality of convolutional neural network neurons mapped to a plurality of discretized bins based on the detected image characteristics of at least the first plurality of different digital images and each corresponding set of camera calibration parameters, wherein each discretized bin of the plurality of discretized bins corresponds to one of the image characteristics; and
a confidence determining means for determining at least one camera calibration parameter for a received digital image based on a second set of detected image characteristics of the received digital image and at least the modified portion of the plurality of convolutional neural network neurons.

* * * * *